Figure 1:
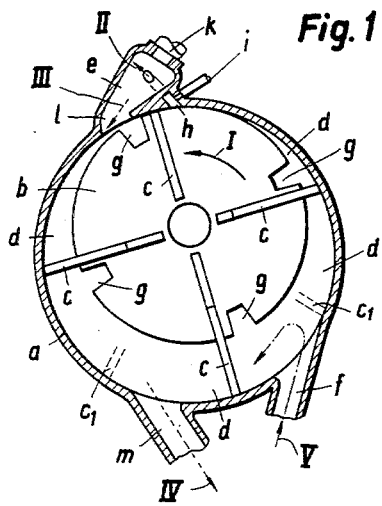

March 15, 1966  F. STÜMPFIG  3,240,189
ROTARY PISTON COMBUSTION APPARATUS
Filed Sept. 12, 1962  2 Sheets-Sheet 1

March 15, 1966     F. STÜMPFIG     3,240,189
ROTARY PISTON COMBUSTION APPARATUS
Filed Sept. 12, 1962     2 Sheets-Sheet 2
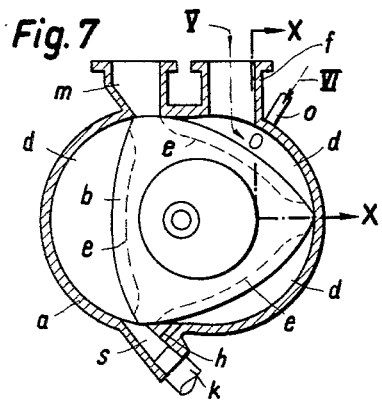
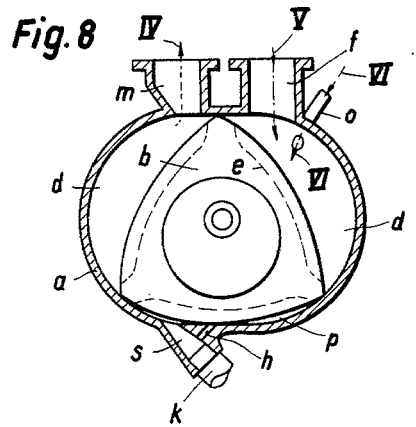
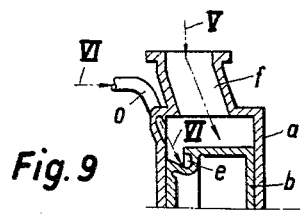
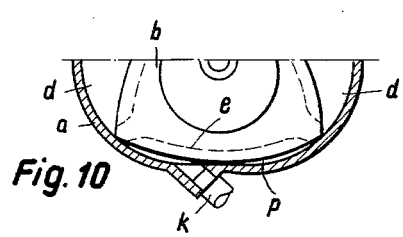
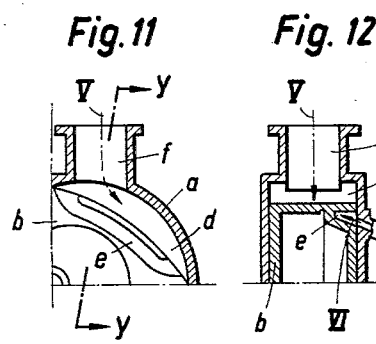
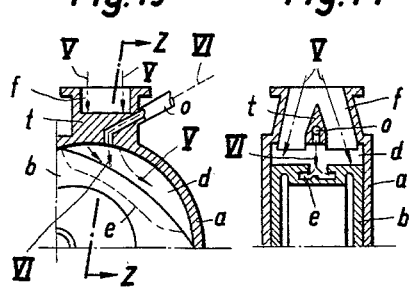
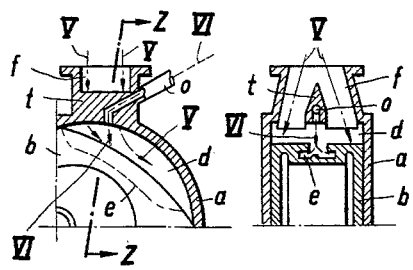
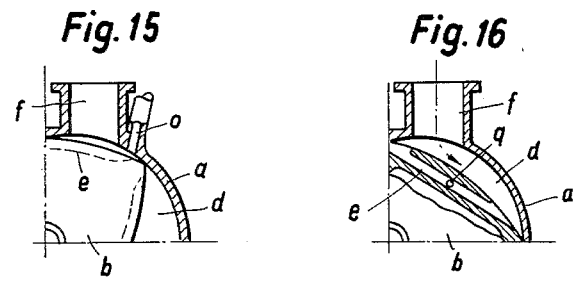
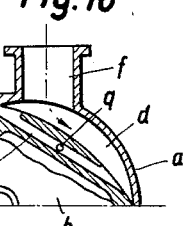

United States Patent Office 3,240,189
Patented Mar. 15, 1966

3,240,189
ROTARY PISTON COMBUSTION APPARATUS
Friedrich Stümpfig, 31 Bismarckstrasse,
Nurnberg, Germany
Filed Sept. 12, 1962, Ser. No. 223,234
3 Claims. (Cl. 123—8)

My invention generally relates to combustion machines and is particularly directed to rotary piston combustion engines and their operation.

The term "rotary piston combustion engine" as used by me in this application, including the appended claims, is deemed to refer to combustion machines or engines of a type wherein ignition of the fuel-air mixture is accomplished by compression or by external means such as a spark and wherein the engine comprises a housing accommodating displacement and separating means which define, in sealing manner, a given number of working or operating spaces whose volume is changed in dependence on the rotation of the displacement and sealing means.

In the known rotary piston combustion engine constructions, the sealing of the individual working spaces is generally insufficient, thereby adversely affecting the operation and output of the machine. The principal reason for the insufficient sealing obtained in the prior art constructions is that the fuel-gas vapor pressures which occur immediately after igntion of the fuel-air mixture are so high that the sealing separating means cannot successfully withstand these pressures which, in turn, results in leakage. Leakage or undesired exit of the fuel gases from the working spaces in turn adversely affects the output of the machine. Further, the fuel consumption is, of course, increased by leakage. The undesired leakage through the sealing means also renders the cooling of the engine more difficult and generally causes premature wear of the machine. Moreover, the leakage problem prevents proper charging of the working spaces. It should also be mentioned that the insufficinet sealing of the working spaces requires relatively high speeds during the starting of the machine.

Another known disadvantage of the prior art rotary piston combustion engine constructions is that a portion of the fuel which enters the working spaces, as for example, in the usual Otto motor, remains in suspended condition in the air up to the moment of ignition. This means that the fuel is ignited in the form of relatively large fuel droplets and for this reason the fuel does not burn in time. This applies particularly in case of high speeds. Furthermore, another portion of the fuel entering the working spaces is hurled against cooled casing walls on which the fuel deposits itself in the form of a liquid layer or coating. This layer is subsequently scraped off by the sealing vanes or ledges which are provided between the individaul working spaces and thus is compacted on concentrated into a small volume. Therefore, this last-mentioned portion of the fuel, after ignition, again does not burn in time. Due to incomplete conbustion for the reasons referred to, the fuel consumption in the prior art rotary piston combustion engine constructions is still higher than in properly constructed reciprocating piston motors.

As previously referred to, a portion of the fuel tends to be deposited on the walls of the working spaces. This deposit results in the additional disadvantage that the lubricating oil film on the casing walls is greatly diluted. This in turn adversely affects the sealing effect of the sealing vanes referred to and, moreover, increases the wear of the machine because the diluted lubricating oil film cannot satisfactorily prevent metallic contact between the thin sealing vanes and the casing walls. For the reasons advanced above, it has been common practice to admix the fuel with lubricating oils so as to reduce the wear on the machine. Further, those wall portions defining the working spaces which are subjected to sliding action during operation of the engine have to be made of wear-resistant material and, moreover, high speeds have to be prevented.

The known rotary piston combustion engine constructions operate with external ignition and compress a homogeneous mixture. For this reason, these prior art constructions have the further drawback that for the purpose of insuring reliable ignition, a fuel rich combustion mixture has to be employed and the compression has to be reduced. This applies particularly in the event that the machine is operated at less than full speed (light load). The use of a fuel rich combustion mixture again increases the fuel consumption and, jointly with the previously mentioned phenomena, causes incomplete combustion. This, in turn, means that the content of poisonous carbon monoxide in the exhaust gases is prohibitively large which, of course, is highly undesired, particularly in city traffic.

The injection and compression of a homogeneous mixture which is to be ignited by external means has other disadvantageous consequences. Thus, for example, the resulting torque of the machine is not satisfactory. Further, knocking phenomena are frequent, particularly in machines having relatively large working spaces. If knocking is to be prevented, expensive high octane fuels have to be used whose lead content usually tends to increase the amount of toxic constituents in the exhaust gases.

In evaluating the prior art rotary piston combustion engine constructions, it also should be considered that these known constructions for Otto operation require gasoline which, of course, is inflammable. Fire danger is thus quite pronounced if the engine is used in aircraft, boats, and for other similar purposes. Diesel oil has not been used for the operation of such engines, although diesel oil, of course, is less inflammable, because compression ignition which would be required for operating such engines which diesel oil would result in extremely high fuel gas pressure so that the sealing difficulties previously referred to would be increased. Further, diesel oil has not been used because the combustion course which takes place as the result of compression ignition is much too slow for operating rotary piston engines at high speeds.

In more recent times, it has been attempted to construct combustion engines which can be operated both with light oils or heavy oils. The prior art rotary piston combustion engine constructions, however, cannot be operated in such manner.

Serious attempts have been made to construct rotary piston combustion engines in which the conversion ratio of fuel energy to effective work is larger than in usual reciprocating piston engines. These attempts, however, have not been successful.

It is a primary object of my invention to overcome the disadvantages and drawbacks of prior art rotary piston combustion engines of the kind referred to and to provide a rotary piston combustion engine construction having superior qualities and better output than the known constructions.

It is also an object of my invention to provide for a method of operating a rotary piston combustion engine construction in an improved manner so as to obtain improved output and lower fuel consumption.

Generally it is an object of my invention to improve on the art of rotary piston combustion engines as hitherto practiced.

According to one feature of my invention, the fuel in atomized condition is introduced into one or several combustion chambers or evaporating chambers (hereinafter referred to as evaporating chambers). In the evaporating chamber, the fuel is deposited on hot wall surfaces which are not contacted by movable elements of the engine. The deposited fuel evaporates from the hot wall surfaces. Prior to ignition, a portion of combustion air compressed in a working space is transferred into the evaporating chamber and is there mixed with the fuel previously injected thereinto. The resulting mixture of fuel and combustion air is then ignited to initiate the combustion, whereafter, subsequently, the burning mixture blows out from the evaporating chamber into a working space containing a further amount of compressed air, whereupon the combustion is completed and the expanding gases of burned fuel cause the effective output of the machine. This procedure is particularly applicable to rotary piston engine constructions which are operated by compression ignition and with heavy oil.

The procedure hereinabove referred to may be amplified by compacting or concentrating the fuel-air mixture which has been formed prior to the ignition toward the ignition area. Further, it is advantageous to throttle or entirely to prevent the access of pure air at least at a time immediately prior to the ignition.

In employing fuel evaporation in the manner previously referred to, it is recommended to conduct the burning mixture, which exits from the evaporating chamber in the form of a fire stream, over the area of deposit of the fuel in the evaporating chamber. In the event of external ignition, the wall portion of the evaporating chamber from which the injected fuel evaporates should be maintained at a relatively high temperature so that up to the moment of ignition, a sufficient amount of fuel evaporates from said wall portion in order to permit slow speed operation of the engine with excess of air.

A further modification of the inventive procedure resides in rinsing out or scavenging the burning mixture from the evaporating chamber.

The inventive procedure may be employed in particularly simple manner if the combustion air and the fuel are sucked into the rotary piston engine construction.

The inventive procedure moreover permits operation with supercharging, that is, the introduction of pre-compressed air into the system prior to ignition.

By proceeding in accordance with the inventive manner, including the evaporating of the fuel on the hot wall portions of the evaporating chamber, fuel may be used which contains fuel components of high, including extremely high, boiling temperature. The fuel may also contain non-combustible moieties of relatively low boiling temperature as, for example, water in any form.

An important feature of the inventive procedure resides therein that the expansion or release of the burned fuel gases takes place in spaces which have a larger volume than the spaces for the air compression.

The inventive procedure, as described hereinabove, can be used in connection with combustion engines of different kinds, but is particularly applicable for use in rotary piston combustion engine constructions as hereinabove defined.

Various kinds of rotary piston combustion engine constructions are known in the art, and the inventive operating procedure is applicable to many, if not most, of them.

For this reason, the embodiments as illustrated in the following drawings serve as illustrations only, as it will be realized by those skilled in the art that the inventive procedure may be used in conjunction with different rotary piston engine constructions, including other combustion engines proper.

In the drawings:

FIGS. 1 through 6 illustrate sectional views through embodiments of rotary piston combustion engine constructions which are arranged and constructed in accordance with this invention to enable operation of the engines pursuant to the inventive method; and FIGS. 7 through 16 illustrate sections through rotary piston engines of different constructions but also equipped to be operated in accordance with the inventive procedure.

The basic difference between the embodiments of FIGS. 1–6, on the one hand, and FIGS. 7–16, on the other hand, is that in the first mentioned embodiments, the engine construction comprises a casing accommodating a rotary piston which rotates about a stationary axis and fitted with reciprocatable vanes acting as separating and sealing means while, by contrast, in the embodiments of FIGS. 7–16, the rotary piston moves within the casing in planetary manner.

Referring now to the drawings, and in particular to FIG. 1, the rotary piston combustion engine construction illustrated therein comprises a cylindrical casing $a$ shown in cross section which accommodates a rotary piston $b$ illustrated in elevation. The rotary piston $b$ has a number of radially extending vanes or separating elements $c$ which are movable toward the wall of the casing $a$. The vanes $c$, upon rotation of the piston $b$ in the direction of the arrow I, move in sealing manner within the piston $b$ and along the wall of the casing $a$ and thus form, in known manner, four co-rotating operating or working spaces $d$. A further working space is constituted by the evaporating chamber $e$ which opens into the space defined by the casing $a$. During rotation of the piston $b$, each of the working spaces $d$ is supplied with air through the air suction line $f$. The air sucked through the line $f$ is forced into the depression $g$ provided on the circumference of the piston $b$ from where the air, as a result of the rotation of the piston $b$, reaches the overflow channel or passage $h$ which opens into the evaporating chamber $e$. A portion of the air which has been compressed in each of the depressions $g$ thus flows through the passage $h$ into the evaporating chamber $e$. During the movement of the air from the depression $g$ through the channel $h$ into the evaporating chamber $e$, the air is charged with fuel through the injection nozzle $i$ which, as seen in FIG. 1, communicates with the passage or channel $h$. The air-fuel mixture enters the evaporating chamber $e$ through the channel $h$ tangentially in the direction of the arrow II and this fuel-air mixture, due to the tangential injection, performs within the evaporating chamber $e$ a circulatory movement. As consequence of this circulatory movement, the fuel droplets which are contained in the air are hurled against the wall of the evaporating chamber $e$. This wall is very hot during operation of the engine as it either is not cooled at all or is cooled only very slightly. As the wall of the chamber is hot, the fuel droplets hurled thereagainst evaporate; in other words, the fuel, prior to ignition, is decomposed into its molecules. The ignition of the fuel is accomplished by means of the spark plug $k$ arranged at the far end of the evaporating chamber $e$ as seen in FIG. 1. Upon ignition of the fuel-air mixture by the spark plug $k$, only partial combustion of the fuel takes place within the evaporating chamber $e$ because a substantial portion of the combustion air remains in each of the depressions $g$ for a period until, upon further rotation of the piston, burning mixture flows out of the evaporating chamber mouth $l$ in the direction as indicated by the arrow III. This burning mixture, before reaching the outlet $l$, passes over the area of deposit of the fuel on the evaporating chamber wall. When the burning mixture exits through the opening $l$, it enters the respective depression $g$ which, at this moment, moves past the opening $l$, and in doing so, the air which is still contained in this depression is ejected by the burning gas mixture into the associated working space $d$. Complete combustion of the fuel now takes place within this working space $d$ under vigorous turbulence. Due to the expansion of the fuel gases, the working effect of the engine is obtained. As the working spaces $d$, during operation, constantly rotate together with the piston, the procedure hereinabove described is constantly repeated. The burned gases exit from the engine through the exhaust line *m* in direction of the arrow IV as shown in FIG. 1. An exhaust gas arrangement (not shown) is arranged in communication with the exhaust line *m* which arrangement may be constructed in known manner so that when two vanes *c1* of one of the working spaces has assumed the position as shown in dash lines, a vacuum effect or suction is created in the exhaust line *m* which causes sucking of air into the respective working space in the direction of the arrow V.

This means, of course, that the engine operates as a two-stroke combustion engine.

It will be realized by those skilled in the art that the engine according to FIG. 1 could be constructed without depressions *g* in which event almost the entire amount of combustion air would be forced into the evaporating chamber *e*.

Figure 2:
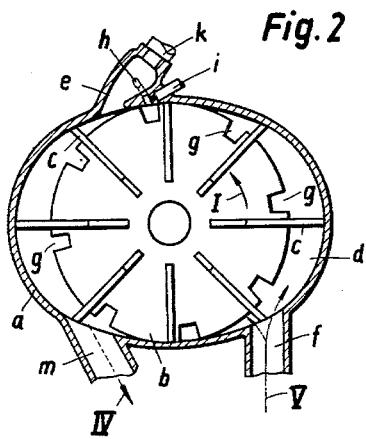

FIG. 2 shows a slightly modified embodiment of a rotary piston combustion engine. The principal difference between the embodiment of FIG. 1 and FIG. 2 is that the casing *a* defines an oval space and that the rotary piston *b* has a larger number of vanes *c*. During rotation of the rotary piston *b* in direction of the arrow I, the combustion air in this embodiment is sucked in the direction of the arrow V in known manner and without the aid of an exhaust arrangement, through the air suction line *f* into the rotating working spaces *d*. The air which thus enters through the line *f* is compressed in the depressions *g* in the same manner as in the embodiment of FIG. 1. Then, as in the construction of FIG. 1, compressed air emanating from the depressions *g* and fuel supplied through the injection nozzle *i* are forced into the evaporating chamber *e*. The fuel is again, as in the embodiment of FIG. 1, hurled against the hot wall of the evaporating chamber so that the fuel evaporates and, mixed with a relatively small amount of air, is ignited by the spark plug *k*. The burning mixture in the form of a fire stream moves past the area of deposit of the fuel into the working space which is then in front of the mouth of the evaporating chamber, whereafter this fire stream mixes with the air within this working space which results in subsequent complete combustion of the fuel. Upon expansion of the gases, these gases are forced from the working spaces into the exhaust line *m*. This engine, therefore, operates according to a four-stroke procedure.

Figure 3:
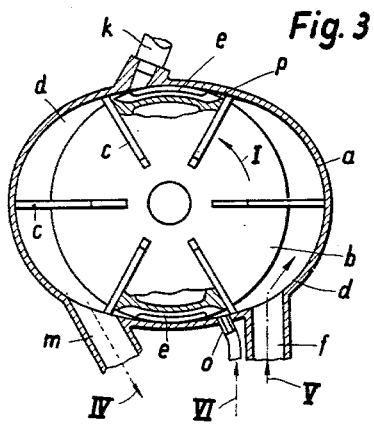
Figure 4:
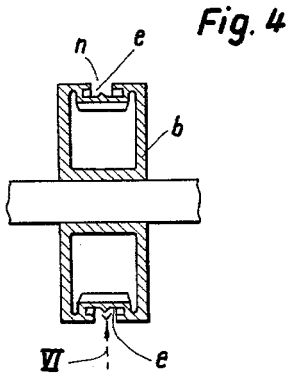

A four-stroke combustion engine of different embodiment is shown in FIG. 3. In this embodiment, the casing *a* again defines an oval inner space and accommodates a rotating piston *d* with reciprocating vanes *c*. FIG. 4 is a longitudinal section through the rotary piston *b* of the embodiment of FIG. 3. In the embodiment of FIGS. 3 and 4, each of the working spaces *d* as defined by the rotary piston is associated with an evaporating chamber *e*. The chamber *e*, according to FIG. 4, communicates with the associated working space through a longitudinal slot *n*. FIG. 3 shows two of the evaporating chambers *e* in partial section. If one of the working spaces *d* moves past the air suction line *f* in direction of the arrow I and thus air is sucked into the working space, the longitudinal slot *n* referred to moves substantially simultaneously past the mouth of the fuel or mixture line *o*. This means that fuel, preferably in the form of fuel rich fuel-air mixture, is sucked in the direction of the arrow VI through the line *o* into the evaporating chamber where the fuel or fuel mixture, in droplet form, is hurled against the hot inner wall of the evaporating chamber and thus is caused to deposit thereon as diagrammatically shown in the lower part of FIG. 4.

Upon further movement of the working space under consideration in the direction of the arrow I, the air which is contained in this working space is compressed partly within the evaporating chamber *e* and partly outside the evaporating chamber, that is, predominantly in the subsequent or trailing portion of the working space, that is, at the area *p* which remains as an air compression space. This compression is continued until the respective working space has been moved toward the igniting area, that is, to the spark plug *k*. In doing so, the fuel which in the meantime has evaporated from the hot wall of the evaporating chamber is moved through the evaporating chamber toward the spark plug *k* and is thus mixed with a minor amount of air. This fuel vapor-air mixture is then ignited by the spark plug *k*. The result of this procedure is that burning mixture blows through the evaporating chamber, first in the direction opposite to the rotary movement, in the direction of the arrow I, and in doing so, still further compresses the air located in the rear portion of the evaporating chamber, that is, the air which is located at the area *p*. During the further movement of the working space in direction of the arrow I, the working space starts to enlarge itself in its leading portion. This, in turn, means that the burning mixture and the air which has been highly compressed at *p* flow through the evaporating chamber in the direction of rotary movement of the piston. Due to the very rapid to-and-fro movement of the burning mixture within the evaporating chamber over the area of deposit of the fuel, a timely and complete evaporation of fuel which may still be deposited within the evaporating chamber is obtained even if the engine is operated at very high speeds and with large fuel quantities. Subsequently, the highly compressed air forces the burning mixture and fuel vapor which may have formed, from the evaporating chamber into the leading portion of the working space where the burning mixture is mixed with further amounts of air under vigorous turbulence. At this time, complete combustion of the fuel takes place substantially outside the evaporating chamber, resulting in the effective work of the engine caused by the expansion of the burned gases. The burned gases are then pushed through the exhaust line *m* in direction of the arrow IV. The same procedure is repeated for each of the following working spaces *d*.

The embodiment of FIGS. 3 and 4 assures reliable deposit of the fuel on the inner wall of the evaporating chamber. This is primarily so because the nature of fuel supply into the evaporating chamber as illustrated in FIG. 4 by the arrow VI favors such deposition. The provision of the narrow longitudinal slot *n* communicating with the evaporating chamber and the working space also contributes to this favorable result. The fuel is deposited in essentially uniform distribution over the entire length of the evaporating chamber because the chamber, during the injection of the fuel, moves past the mouth of the fuel or mixture line *o*.

Figure 5:
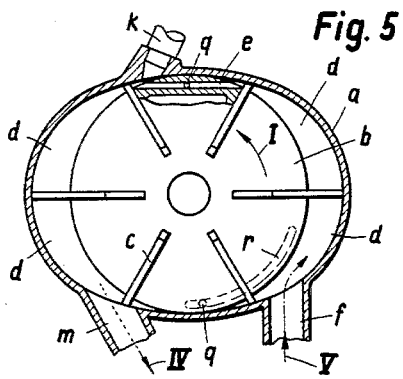
Figure 6:
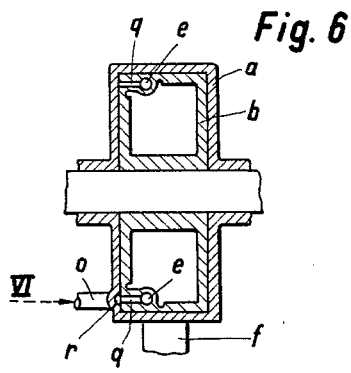

FIG. 5 shows a sectional view of a still further embodiment, while FIG. 6 is a longitudinal section through the machine of FIG. 5. In this latter embodiment, each of the working spaces *d* is associated with a bore *e* which extends in the rotational direction. The bore *e* serves as evaporating chamber. The opposite ends of each of the evaporating chambers or bores *e* open up into the associated working space *d*. Each of the evaporating chambers, moreover, is provided with a transverse bore *q* which points toward one of the end sides of the rotary piston *b*. During sucking of air into the working space *d*, the mouth of the transverse bore *q* is moved along a groove *r* which is arranged in the casing end wall. The groove *r* communicates with the fuel or mixture line *o* so that during the introduction of air into the working space, fuel is sucked into the evaporating chamber at the same time, as indicated by the arrow VI. This fuel within the evaporating chamber is forced against the inner wall thereof so as to cause deposit of fuel. During the further rotary movement of the respective working space, the same procedure as explained in connection with the embodiment of FIGS. 3 and 4 takes place.

The inventive operating procedure is not limited for use with combustion engines wherein the rotary piston rotates about a stationary axis. The inventive operating procedure can equally well be used in connection with a rotary piston combustion engine wherein the piston performs a planetary rotary movement within a casing. The application of the inventive principles to such planetary moving piston is illustrated and explained in connection with five different embodiments in FIGS. 7 through 16.

FIGS. 7 and 8 are sectional views of a planetary rotary piston engine illustrating a piston in different positions, while FIG. 9 is a longitudinal section along line X—X of FIG. 7. The rotary piston $b$ performs a planetary rotary movement within the casing $a$. The piston forms in known manner three co-rotating working spaces $d$ which co-rotate in clockwise direction. The piston seals the individual working spaces $d$ against each other and changes the volume of these spaces. Air is sucked successively into these spaces through the line $f$ as indicated by the arrow V. At the start of the air suction in one of the working spaces, the piston $b$ is in the position shown in FIG. 7 and shortly prior to the completion of the air suction in a working space, the piston is in the position shown in FIG. 8. An evaporating chamber $e$ is arranged in each of the three arc-shaped walls of the rotary piston $b$. These evaporating chambers $e$ are each formed by a relatively large groove which extends almost over the entire length of one of the arc-shaped walls of the rotary piston as can be clearly seen in FIG. 9 and as indicated in broken lines in the working spaces $d$, the associated evaporating chamber $e$ is moved past the mouth of the fuel or mixture line $o$ which latter is provided at one of the casing end walls. For this reason, fuel is supplied into the associated evaporating chamber $e$ in the direction of the arrow VI at the same time as the air is sucked into one of the working spaces. The fuel is preferably in the form of a fuel rich fuel-air mixture. The fuel is hurled against the hot wall of the respective evaporating chamber and, due to the rotary movement of the piston, is deposited substantially uniformly distributed over the entire length of the evaporating chamber wall. During the further rotary movement of the piston, each of the working spaces $d$ with its associated evaporating chamber $e$ moves past the spark plug $k$ and the ignition chamber $s$ as seen in FIG. 8. In doing so, the air which is present within the working space $d$ is forced or urged partly into the evaporating chamber $e$ and is partly compressed in the trailing portion of the working space at the area $p$. Further, the fuel which in the meantime has substantially evaporated within the evaporating chamber, is forced in the form of fuel vapor mixed with a small amount of air into the ignition chamber $s$ and through the bore $h$ directly toward the spark plug $k$. After ignition of the mixture, burning mixture is ejected from the ignition chamber $s$ and passes through the bore $h$ into the evaporating chamber $e$ so that at this stage, as in the machines of FIGS. 3 through 6, first burning mixture in the form of a fire stream flows through the evaporating chamber $e$ from the front toward the rear and thus still further compresses the air which is located at the area $p$. In the course of the further movement of the piston, the front portion of the evaporating chamber becomes enlarged again. For this reason, the burning mixture and the highly compressed air at $p$ now flow through the evaporating chamber from the rear toward the front. Owing to the rapid to-and-fro movement of burning mixture in the evaporation chamber, rapid and complete evaporation of fuel which may still be deposited in the evaporating chamber as well as the constant heating of the walls of the evaporating chamber is effected. Due to the subsequent flow of the highly compressed air, the burning mixture and fuel vapor which may be formed is rinsed or scavenged from the evaporating chamber into the enlarging front portion of the working space where the burning mixture is mixed under vigorous turbulence with further amounts of air. Complete combustion of the fuel therefore takes place essentially outside of the evaporating chamber and the effective work is obtained upon expansion of the gases. After expansion of the gases, the gases are ejected through the exhaust line $m$ in the direction of the arrow IV.

The ignition chamber $s$ may be eliminated and instead the spark plug $k$ can be moved close to the inner space of the casing as shown in FIG. 10.

A different arrangement for the evaporaitng chamber in a machine which otherwise corresponds to that shown in FIGS. 7–10 is illustrated in FIGS. 11 and 12. FIG. 11 is a fragmentary cross section, while FIG. 12 is a longitudinal section along line Y—Y of FIG. 11. In the machine of the last-mentioned embodiment, each of the working spaces $d$ is associated with an evaporating chamber $e$ arranged in the piston $b$. Each evaporating chamber is somewhat shorter than the arched walls of the rotary piston and is opened along its entire length toward one end wall of the casing $a$ and at its both ends toward the working space $d$. The fuel or mixture line $o$ is provided at the casing end wall. For this reason, during the sucking of air in the working spaces $d$ in the arrow direction V, fuel is simultaneously sucked in the direction of the arrow VI into the evaporating chambers $e$ which move past the mouth of the line $o$. The fuel is deposited on the chamber wall along the entire length thereof. The subsequent operating procedure corresponds to the one described in connection with the machine of FIGS. 7–10.

With regard to the machine of FIGS. 7–10, it is also feasible to arrange the evaporating chambers about in the middle of the arc-shaped wall portion of the rotary piston, as is illustrated in FIGS. 13–16. The evaporating chamber $e$ may be shaped in the manner corresponding to the longitudinal section shown in FIG. 14 which is taken along line Z—Z of FIG. 13. In other words, the evaporating chamber $e$ may have a narrow longitudinal slot toward the working space which slot, as shown in FIG. 13, extends almost along the entire length of one of the arc wall portions of the piston $b$. The fuel line $o$ passes through a web member $t$ which is inserted in the air suction line $f$ so that during the air suction in one of the working spaces $d$ in the arrow direction V, fuel is, at the same time, sucked in the arrow direction VI from the line $o$ into the associated evaporating chamber wherein the fuel is deposited on the entire length of the evaporating chamber wall. Of course, it is also feasible to arrange the fuel line $o$ in the rotational direction of the piston $b$ behind the air suction line $f$ as seen in FIG. 15.

As shown in FIG. 16, a bore $e$ is provided in each of the arc-shaped walls of the rotary piston $b$, and may serve as evaporating chamber if a transverse bore $q$ leads to one of the end faces of the rotary piston and if, corresponding to the engine of FIGS. 5 and 6, a groove and a fuel line communicating therewith are provided at the end wall of the casing $a$. During sucking of air in one of the working spaces $d$ in the direction of the arrow of FIG. 16, the cross or transverse bore $q$ of the associated evaporating chamber $e$ moves in sealing manner past the groove so that, at the same time, fuel is sucked through the groove and the cross bore $q$ into the evaporating chamber $e$ where the fuel is deposited. The further operating procedure is the same as in the engine of FIGS. 7–10.

The burning mixture which, after ignition, rapidly traverses the evaporating chambers, makes sure that the walls of the evaporating chambers are sufficiently heated. Therefore, even if the machine is operated at low speeds, sufficient fuel evaporates prior to the external ignition so as to enable operation with air excess. It is advantageous to connect the walls of the evaporating chambers with the other elements of the engine by thin walls or wall elements as is indicated in some of the figures of the drawings, wherein a thin-walled connection between the walls of the evaporating chamber and the rotary piston is indicated.

It is also feasible to construct the evaporating chambers as separate elements which are insulated against the other machine elements by suitable sealing means. Further, it is within the scope of this invention to line the evaporating chamber walls with porous materials such as sinter metal, so that in this manner less heat is conducted from the evaporating chamber walls.

It will be realized that the fuel injection into the evaporating chambers may be accomplished by squirting or injecting the fuels by means of a fuel pump during the air suction into the working spaces. Such fuel introduction may also be performed somewhat later.

It should be emphasized that an inventive rotary piston engine operated with gasoline results in important advantages, even if the fuel is not deposited and evaporated in the evaporating chamber, but if the fuel is maintained in suspended condition in the air up to the point of ignition and the compression of the tar takes place partly in the evaporating chamber and partly outside thereof. In such an instance, as applied to external ignition, the engine, even if operated at less than full speed, can be operated with a small air excess. Further, the fuel deposition on the sliding surfaces of the machine is reduced and the maximum ignition pressure is decreased. However, it is more advantageous if the fuel evaporates in the evaporating chamber in the manner hereinabove described.

Each of the machines hereinabove described can be adapted for compression ignition. For this purpose, the total compression space should be correspondingly reduced, that is, the volume of the evaporating chambers and the air compression spaces should be decreased. In order to accomplish compression ignition, the fuel may be sucked into the evaporating chamber or it may be injected thereinto. Due to the rapid fuel evaporation on the wall of the evaporating chamber and due to the division of the combustion procedure in a pre-combustion which takes place in the evaporating chamber and a residual complete combustion which takes place in the working spaces, a total combustion is arrived at which permits very high speeds and which is much less vigorous and smoother than in the usual diesel motors.

If the inventive engines are operated with heavy oil, for example, diesel oil, it is advantageous for the purpose of starting the machine to evaporate the oil outside the engine and then to supply the fuel vapor together with air to the working spaces. The fuel vapor may also be sucked into the evaporating spaces separated from the main portion of the air. The evaporation of the diesel oil outside the machine may be accomplished by means of an electrically operated heating device or the like.

The inventive operating procedure is applicable to all combustion engines wherein the working spaces are sealed against each other by a rotating machine element and whose volumes change during rotation. These machines conceivably could also be constructed in known manner by providing a stationary piston and a casing which rotates thereabout, or both the casing and the piston could rotate. Other combustion engines with rotating parts are known, for example, engines having swash plates, plungers, two-teeth gears, etc. All these prior art machines can be adapted for operation according to the inventive procedure and thus may be arranged as two-stroke or four-stroke machines. In two-stroke machines, the fuel, during the scavenging or rinsing of the working spaces, may be blown into the evaporating chamber by means of rinsing air.

It should be emphasized that the walls of the evaporating chamber, during operation, may reach a temperature which is higher than the ignition temperature of the fuel. This is so because the pronounced turbulence of the fuel-air mixture the evaporating chamber prevents premature self-ignition of the fuel. This fact, and the effect of the hot fire stream which blows across the inner wall of the evaporating chamber and has a temperature in excess of 2000° C., permit the employment of a fuel which contains components of average and very high boiling temperatures. Further, the fuel may be admixed with non-combustible substances of a particularly low boiling temperature, for example, water. Such a mixed fuel is presently not on the market but would successfully prevent fire during accidents since such fuel mixture, upon exit from the engine could, at the best, cause the formation of a vapor mixture which would only comprise minute amounts of combustible components, the major portion of the vapor mixture being formed from non-combustible components. Within the engine, however, such a mixed fuel will be entirely evaporated on the chamber wall and is then converted into a hot vapor mixture which, admixed with air, is reliably ignited by the very hot spark of a spark plug. The combustion would also be sufficiently rapid, due to the fuel evaporation within the evaporating chamber and due to the turbulence of the mixture caused by the fire stream.

A principal object of the inventive operating procedure is to reduce heat losses so that the rotary piston combustion engine effectively utilizes the fuel. For this purpose, the burned gases expand in spaces which are larger than the spaces which are used for the compression of the air. Rotary piston combustion engines can be easily adapted to this effect. For example, according to the machines of FIGS. 1–6, the piston $b$ need only be moved within the casing $a$ somewhat toward the right so that the working spaces for the air suction are smaller than the spaces for the gas expansion. For the same purpose, rotary piston combustion engines can be constructed so that the release or expansion of the gases takes place in two stages. The first expansion stage takes place in a prior art customary rotary piston combustion engine or in a machine in accordance with this invention. However, in addition to such a rotary piston combustion engine, for example, a machine as shown in FIG. 7, the machine shaft may carry, for a second expansion stage, a second rotary piston machine or a different type of rotary machine. Suitable for this purpose is, for example, a machine according to FIG. 1 if in this machine the rotary piston $b$ is provided with one vane $c$ only and no depressions $g$ are arranged on the piston. In such a construction, the line $f$ should be arranged at the casing $a$ at the area of the evaporating chamber $e$, and to the right thereof, seen in the direction of the drawing, the exhaust line $m$ should be arranged. Further, both machines should be placed adjacent each other so that they have the same rotational direction and the exhaust gas line of the rotary piston combustion engine proper should be connected with the supply line for the second machine.

To provide additional means for the purpose of obtaining effective expansion of the burned gases, is extremely important even in the known rotary position combustion engines. This is so because in these machines, due to the substantially continuous supply of mixture, the working spaces are charged to a considerable extent and therefore a significant pressure drop can be utilized for the working effect. However, still more important is an effective release or expansion of the burned gases in machines which are arranged in accordance with this invention. In this machine, the amount of burned gases and, in turn, the utilizable pressure drop, are particularly great because the air suction likewise takes place substantially continuously and a fuel deposit in the air suction line is eliminated. The suction air, therefore, need not be heated and the fuel evaporation which is caused in the evaporating chambers diminishes the heat losses. Caused by the evaporation of the fuel in the evaporating chambers and due to the creation of the fire stream, a timely complete combustion takes place even if large fuel amounts are used with complete utilization of the supplied air. If the machine is operated at high speeds, radiation losses are also reduced. The machines can be operated with excess of air even at low speeds. Further, since the combustion is relatively smooth, large working spaces can be used and these working spaces can be charged with pre-compressed and, if desired, heated air which again greatly diminishes any heat losses. For the purpose of pre-compressing and heating the air, the rotary piston combustion engine may be associated with a prearranged rotary piston air compressor and a suitable heat exchange device. The arrangement may be so that the heat exchanger causes cooling of the machine and returns exhaust heat into the operating cycle.

In conclusion, it should be stated that the inventive operating procedure results in the following advantages if compared with the known rotary piston combustion engines:

A. High maximum pressures caused by the burned gases and the mentioned drawbacks resulting therefrom are prevented. This is accomplished by two measures: (1) The evaporation of the fuel which is first deposited on the hot wall surfaces of the evaporating chamber, partially takes place during the combustion and therefore explosion-like combustion of the total amount of fuel in the system cannot take place; and (2) The combustion course is divided into a pre-combustion which takes place in the evaporating chamber and a residual complete combustion which takes place in a working or air compression space which again effectively prevents the occurrence of high maximum pressure.

B. A smooth knock-free combustion is obtained even if the engine is operated with inexpensive fuels of low octane value and if the machine has large working spaces. This also holds true of a machine which is supercharged and the machine is operated with extremely high compression. In this manner, fuel consumption and fuel expense are reduced, favorable torques are obtained and the output of the machine is superior to that compared with the known engines.

C. Incomplete combustion of fuel droplets suspended in the air and of fuel deposited on cooled wall portions is prevented since the fuel, prior to its combustion, is deposited on hot wall surfaces and thus evaporates therefrom. This, in turn, means that the fuel, prior to its combustion, is decomposed into its molecules and thus is brought into a condition which is particularly favorable from a combustion point of view. This, in turn, effectively reduces the fuel consumption and also reduces the amount of toxic carbon monoxide in the exhaust gases.

D. Since the fuel is supplied to the evaporating chamber separately from the main portion of the air and the fuel is evaporated in the evaporating chamber, a preheating of the air sucked into the system can be eliminated. Further, complicated fuel injection systems are eliminated. All this results in favorable torques, high outputs and low production costs.

E. High speeds of the machine and thus high machine outputs as well as an improvement of the combustion and a further reduction of the fuel consumption and of the carbon monoxide content in the exhaust gases are obtained by the relatively long evaporation time as well as by the creation of the very hot fire stream which moves past the area of deposition of the fuel. This is so because this procedure results in a rapid and complete evaporation of very large fuel quantities and causes an intimate mixture of the fuel vapors thus produced with the total amount of air in the system. Further, the scavenging of the burning mixture from the evaporating chamber by means of highly compressed air further contributes to the reduction of the fuel consumption and of the content of carbon monoxide in the exhaust gases.

F. Dilution of the lubricating oil film on the sliding surfaces of the engine by means of fuel droplets is entirely eliminated by the deposition and evaporation of the fuel within the evaporating chamber. For this reason, wear of the machine is effectively reduced even if the machine is operated at high speeds. Any special lining of the sliding surfaces in the working spaces is unnecessary.

The defects of known rotary piston combustion engines as occurring low speed of such engines and as referred to above are overcome in the present arrangement by supplying the entire fuel into the evaporating chamber and by compressing a substantial portion of the combustion air outside of the evaporating chamber. Further, by causing the evaporation of the fuel in the evaporating chamber and by concentrating the fuel vapors at the area of ignition, the disadvantages of the prior art constructions are effectively overcome. The beneficial effect is further increased by excluding air from the area of ignition at a period prior to ignition, because the ignition by the spark plug in the evaporating chamber is rendered possible, even if the machine during low speed is operated with a substantial air excess. Again, this results in lower fuel consumption and a lower content of poisonous carbon monoxide in the exhaust gases.

The inventive engine may be operated with light fuels such as gasoline, or heavy fuel such as diesel oil, and the same machine may be used with both types of fuel. If the operation of the machine is switched from one type of fuel to another type, it is still not necessary to employ compression ignition since heavy oil is also evaporated and the heavy oil vapors are reliably ignited by the spark plug. Further, due to the subdivision of the total combustion course into a pre-combustion in the evaporation chamber and the residual combustion in a working space, a smooth combustion without high fuel gas pressures is obtained even if heavy oils having a knocking tendency are used.

The inventive engines could also be operated with safety fuel mixture which presently is not on the market as yet, which mixture consists of fuel components of average and high boiling temperatures and also comprises non-combustible matter with low boiling temperatures. Such fuel would not form a combustible mixture if the fuel should be ejected out of the machine, for example, by a collision or the like accident. In this manner, fire danger is prevented.

It should also be pointed out that due to the inventive operating procedure, larger quantities of burned fuel gases are produced and by effectively expanding and releasing these gases, the heat losses are greatly diminished. This, of course, means that the total effect and output obtained by the machine is extremely satisfactory and this result is obtained with simple means without increasing the production costs and the space.

While specific embodiments of the invention have been shown and described in detail to illustrate the application of the principles of the invention, it will be understood that this invention may be embodied otherwise without departing from such principles.

What is claimed is:

1. An internal combustion engine comprising, in combination, a housing; a piston within said housing; said housing and piston conjointly defining plural working spaces cyclically variable in volume by relative rotational movement of said housing and piston to first expand and then contract twice during each cycle; means providing a respective evaporation chamber for each working space, each evaporation chamber being in constant communication with its respective working space; means introducing fuel into each evaporation chamber, during the first expansion of its associated working space, and depositing the fuel on the chamber wall to evaporate; means introducing combustion air into said working spaces, during the first expansion thereof, for compression therein, with forcing of some air into the associated evaporation chamber for mixture with the fuel deposited and evaporated in the latter, for compression of said air and fuel-air mixture, during the first contraction of the associated working space, to a pressure less than that effecting self-ignition of the fuel-air mixture; and external ignition means operable to ignite the fuel-air mixture in each evaporation chamber, just before the second expansion of the associated working space, for injecting a burning mixture into the associated working space for substantially complete combustion of said mixture by the remainder of the air in the latter; said complete combustion effecting the second expansion of the associated working space.

2. An internal combustion engine, as claimed in claim 1, wherein each evaporation chamber has a channel form; said fuel introducing means directing the fuel introduced into the evaporation chambers onto those parts thereof swept at high velocity by said burning mixture.

3. An internal combustion engine, as claimed in claim 1, said evaporation chambers being provided in said piston and extending substantially in the direction of revolution of said piston; each evaporation chamber being connected with its respective working space by a narrow slot extending longitudinally thereof; said slots, during the revolution of the piston, being aligned with the fuel introduction means and said external ignition means.

References Cited by the Examiner

UNITED STATES PATENTS

| | | | |
|---|---|---|---|
| 1,311,858 | 7/1919 | Fischer | 60—15 |
| 1,954,644 | 4/1934 | Obeshaensli | 123—30 |
| 2,422,610 | 6/1947 | Bagnulo | 123—32 |
| 2,799,257 | 7/1957 | Stumpfig et al. | 123—32 |
| 2,927,560 | 3/1960 | Breelle. | |
| 3,044,455 | 7/1962 | Papa et al. | 123—30 |
| 3,053,238 | 9/1962 | Meurer | 123—8 |
| 3,136,302 | 6/1964 | Nallinger et al. | 123—8 |
| 3,144,006 | 8/1964 | Meurer | 123—8 |

FOREIGN PATENTS 473,371    9/1914    France.

SAMUEL LEVINE, *Primary Examiner.*

JOSEPH H. BRANSON, JR., KARL J. ALBRECHT,
*Examiners.*